United States Patent
Cohen et al.

(10) Patent No.: US 10,058,826 B2
(45) Date of Patent: Aug. 28, 2018

(54) AUTOMATIC RELEASE OF PRESSURE IN A HOME SODA MACHINE

(71) Applicant: Sodastream Industries Ltd., Ben Gurion Airport (IL)

(72) Inventors: Avi Cohen, Jerusalem (IL); Allan Ring, Mercaz Shapira (IL); Eitan Landau, Netanya (IL); Yossi Haviv, Rehovot (IL); Hagai Harduff, Binyamina (IL); Doron Krom, Zikhron Yaacov (IL); Carmel Goldshmid, Kfar Saba (IL); Eyal Shmueli, Reut (IL)

(73) Assignee: SodaStream Industries Ltd., Airport City (IL)

( * ) Notice: Subject to any disclaimer, the term of this patent is extended or adjusted under 35 U.S.C. 154(b) by 106 days.

(21) Appl. No.: 14/748,252

(22) Filed: Jun. 24, 2015

(65) Prior Publication Data

US 2015/0367296 A1 Dec. 24, 2015

Related U.S. Application Data

(60) Provisional application No. 62/016,108, filed on Jun. 24, 2014.

(51) Int. Cl.
*B01F 3/04* (2006.01)
*A23L 2/54* (2006.01)

(52) U.S. Cl.
CPC ............ *B01F 3/04794* (2013.01); *A23L 2/54* (2013.01); *B01F 2003/04822* (2013.01)

(58) Field of Classification Search
CPC ........ B01F 2003/04822; B01F 3/04794; A23L 2/54
See application file for complete search history.

(56) References Cited

U.S. PATENT DOCUMENTS

| | | | |
|---|---|---|---|
| 3,953,550 A | 4/1976 | Gilbey | |
| 4,304,741 A * | 12/1981 | Avison | B01F 3/04801 206/0.6 |
| 4,323,090 A * | 4/1982 | Magi | B01F 13/0033 141/279 |
| 4,342,710 A * | 8/1982 | Adolfsson | B01F 13/0033 261/121.1 |
| 4,401,016 A | 8/1983 | Adams et al. | |
| 4,610,282 A * | 9/1986 | Brooks | B01F 3/04801 141/46 |

(Continued)

FOREIGN PATENT DOCUMENTS

EP 1642637 4/2006

OTHER PUBLICATIONS

Ace "Rotary Dampers" published Jun. 2011.*

(Continued)

*Primary Examiner* — Amber R Orlando
*Assistant Examiner* — Stephen Hobson
(74) *Attorney, Agent, or Firm* — Pearl Cohen Zedek Latzer Baratz LLP (57) ABSTRACT

A home carbonation system includes a mechanical lock to lock a bottle within the carbonation system during carbonation. The system also includes a gradual releaser to controllably release pressure after the carbonation and to delay the unlocking of the bottle from the mechanical lock after the carbonation has ended.

4 Claims, 9 Drawing Sheets

(56) References Cited

U.S. PATENT DOCUMENTS

| | | | |
|---|---|---|---|
| 5,209,378 A * | 5/1993 | Wiseburgh | B01F 13/0033 |
| | | | 141/114 |
| 5,260,081 A | 11/1993 | Stumphauzer et al. | |
| 5,758,700 A * | 6/1998 | Vanderploeg | B67D 1/008 |
| | | | 141/113 |
| 5,870,944 A * | 2/1999 | Vander Zalm | A23L 2/54 |
| | | | 261/DIG. 7 |
| 7,975,988 B2 | 7/2011 | Thomson et al. | |
| 8,888,073 B2 * | 11/2014 | Leung | A23L 2/54 |
| | | | 261/38 |
| 8,920,860 B2 | 12/2014 | Ring et al. | |
| 9,339,056 B2 * | 5/2016 | Njaastad | A23L 2/54 |
| 9,687,796 B2 * | 6/2017 | Hoare | B01F 3/04794 |
| 9,723,863 B2 * | 8/2017 | Njaastad | A23L 2/54 |
| 2007/0257380 A1 * | 11/2007 | Thomson | B01F 3/04794 |
| | | | 261/64.5 |
| 2013/0037969 A1 * | 2/2013 | Ring | B01F 3/04794 |
| | | | 261/63 |
| 2014/0097549 A1 | 4/2014 | Hoare et al. | |

OTHER PUBLICATIONS

International Search Report for corresponding PCT application PCT/IB2015/054726 dated Oct. 11, 2015.
International Search of EP Application No. 15 81 1372 dated Jan. 17, 2018.

* cited by examiner

AUTOMATIC RELEASE OF PRESSURE IN A HOME SODA MACHINE

CROSS-REFERENCE TO RELATED APPLICATIONS

This application claims benefit from U.S. Provisional Patent Application No. 62/016,108, filed Jun. 24, 2014, which is hereby incorporated in its entirety by reference.

FIELD OF THE INVENTION

The present invention relates to carbonation machines generally and to pressure release in particular.

BACKGROUND OF THE INVENTION

Soda machines for the carbonation of beverages are known in the art. Most such devices for home carbonation are designed for manual operation; typically comprising a manually operated gas release valve to release carbon dioxide ($CO_2$) into a bottle of water from an attached pressurized cylinder. Such machines typically also comprise one or more safety pressure release valves which are designed to vent if excess pressure builds up during the carbonization process.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

SUMMARY OF THE PRESENT INVENTION

There is therefore provided, in accordance with a preferred embodiment of the present invention, a home carbonation system. The system includes a mechanical lock to lock a bottle within the carbonation system during carbonation and a gradual releaser to controllably release pressure the carbonation and to delay the unlocking of the bottle from the mechanical lock after the carbonation has ended.

Moreover, in accordance with a preferred embodiment of the present invention, the system also includes a carbonating arm connected to the housing of the system via a spring and where the carbonating arm is lowerable during the carbonation, the carbonating arm having a cam surface; a normally open valve having a plunger pressable by the cam surface during carbonation to seal the valve and where the gradual releaser includes a damper to enable the spring to gradually raise the carbonating arm after the carbonation with a controlled velocity to gradually unpress the plunger and to gradually unseal the valve.

Further, in accordance with a preferred embodiment of the present invention, the damper is a viscose damper.

Still further, in accordance with a preferred embodiment of the present invention, the system also includes a bottle holder to hold the bottle during the carbonation and an axis around which the bottle holder rotates at an angle to receive the bottle for carbonation and to release the bottle after carbonation and where the mechanical lock includes a recessed area in which a protrusion of the bottle holder sits when the bottle is in an upright position and the carbonating arm is lowered and where the recessed area prevents the bottle holder from rotating around the axis when the carbonating arm is lowered.

Additionally, in accordance with a preferred embodiment of the present invention, the system also includes an exhaust valve having an exhaust pin and where the exhaust pin extends from the exhaust valve when the exhaust valve is under pressure and where the exhaust pin engages with a recessed area of a secondary cam surface when extended to prevent the bottle holder rotating around the axis.

There is therefore provided, in accordance with a preferred embodiment of the present invention, an interlock system for a home carbonation machine. The system includes a bottle holder to hold a bottle during carbonation; an axis around which the bottle holder rotates at an angle to receive the bottle for the carbonation and to release the bottle after the carbonation; an exhaust valve having an exhaust pin and where the exhaust pin extends from the exhaust valve when the exhaust valve is under pressure; a cam surface having a recessed area and where the exhaust pin engage with the recessed area when the exhaust pin is extended and where the engaged exhaust pin prevents the bottle holder rotating around the axis.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that when a soda bottle is released from a carbonation system too soon after carbonation, the bottle may be dangerously pushed away, via a projectile effect, from the carbonation system. The early release may also cause excess frothing from the bottle resulting in a loss of carbonated water from the bottle.

Applicants have also realized that the time taken after carbonization for the bottle pressure to be released may be substantial for some users.

Applicants have further realized that these issues may be overcome by releasing pressure gradually after carbonation and allowing the user to release the resulting bottle of carbonated water only once it has been depressurized to atmospheric pressure.

Figure 1:
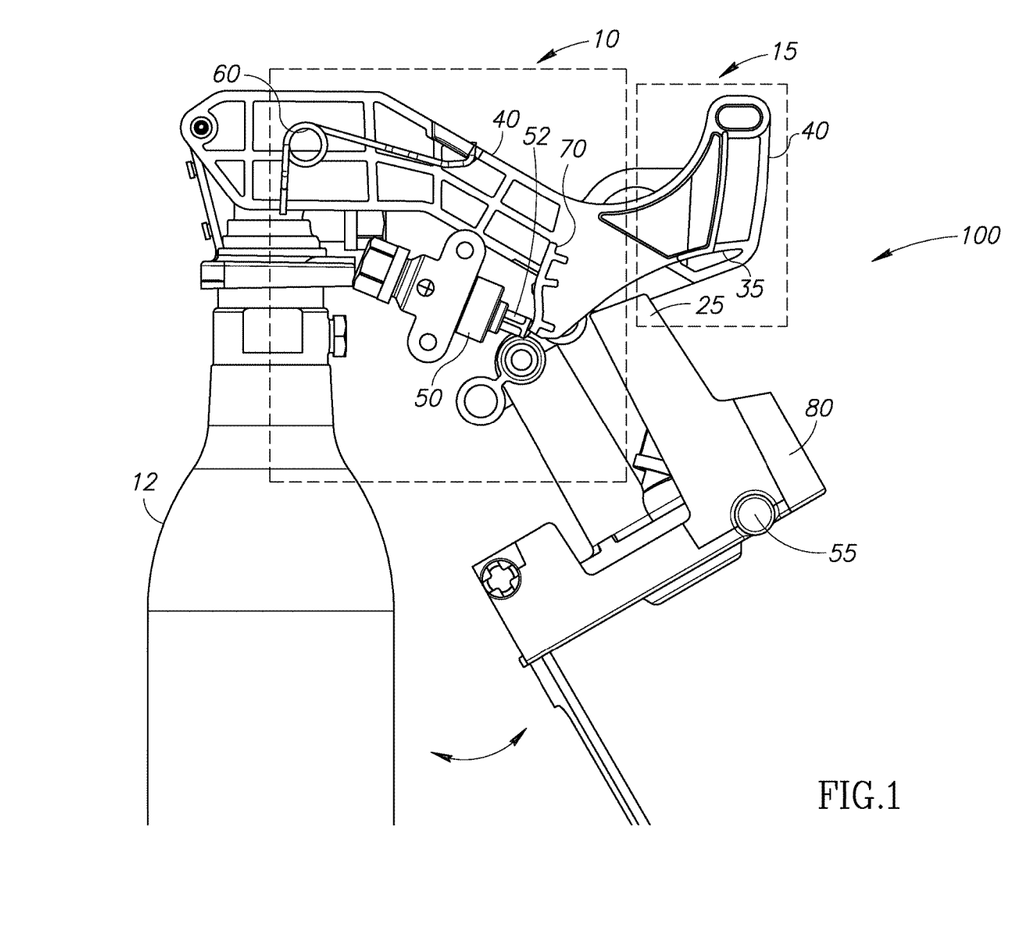
FIG. 1 is a schematic illustration of a home carbonation system; constructed and operative in accordance with the present invention.

Reference is now made to FIG. 1 which illustrates a home carbonation system 100 in accordance with an embodiment of the present invention. Home carbonization system 100 comprises a gradual releaser 10 and a mechanical lock 15. Gradual releaser 10 comprises a carbonating arm 40 and a normally open valve 50. Normally open valve 50 may comprise a plunger 52. Carbonating arm 40 may comprise a cam surface 70 and may be connected at one end to gas cylinder 12 (via a pin 8 (not shown)) and at the other end may have a slider 20 (also not shown) attached to it. Slider 20 may enable a user 5 to perform the carbonation process by using slider 20 to lower carbonating arm 40 as described in more detail herein below. Carbonating arm 40 may be connected to the housing of system 100 (not shown) via a torsion spring 60. Spring 60 may push on carbonating arm 40 when pivoted and supported by the housing. Mechanical lock 15 comprises a recessed area 35 of carbonating arm 40 and a protrusion 25 of a bottle holder 80. FIG. 1 illustrates system 100 in a pre-carbonation state where normally open valve 50 is open (piston 52 is out) and carbonating arm 40 is in its most upright position.

It will be appreciated that the tension of spring 60 may be pre-set so that when user 5 pushes slider 20 (and carbonating arm 40) downwards and then releases it and if there is no additional resistance, spring 60, carbonating arm 40 and slider 20 may automatically return to their original position.

Figure 2A:
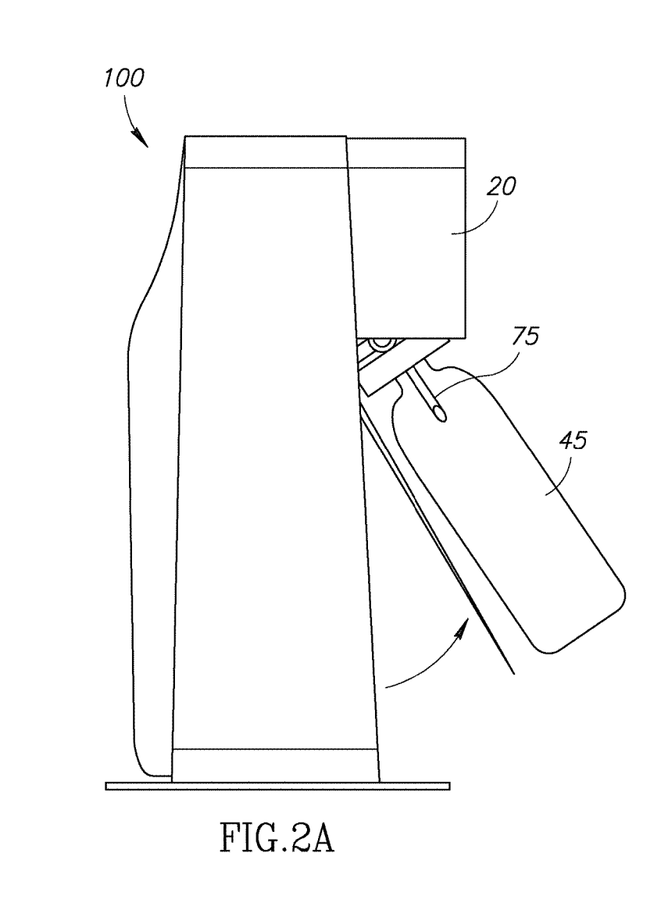
FIGS. 2A and 2B are alternative views of the home carbonation system of FIG. 1, constructed and operative in accordance with the present invention.
Figure 2B:
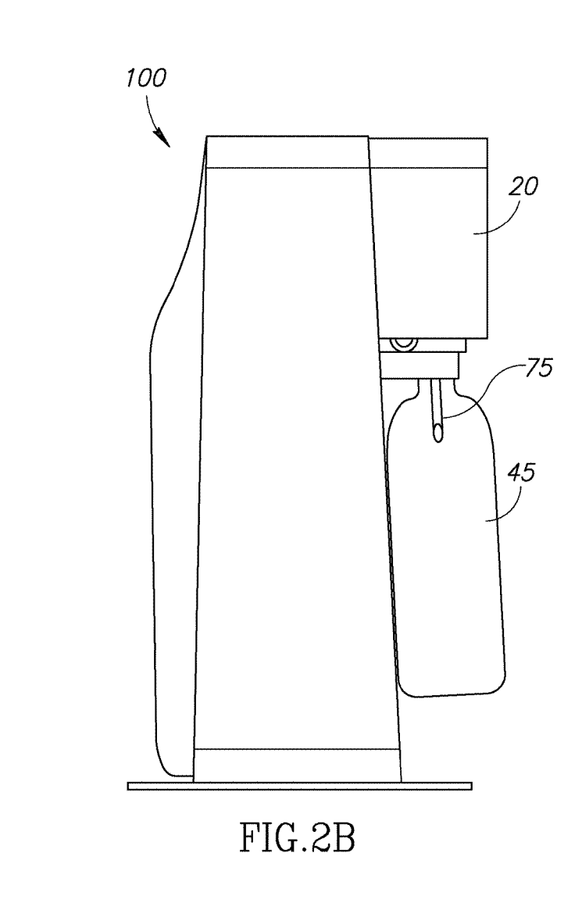

It will also be appreciated that a bottle of water 45 may be attached to bottle holder 80 via a pronged clamp (not shown) initially at an angle as illustrated in FIGS. 2A and 2B to which reference is now made. When carbonating arm 40 is in its rest position, bottle holder 80 may partially rotate around axis 55 (FIG. 1) in a tilting like movement allowing bottle 45 to be added and removed at an angle. The pronged clamp 85 (not shown) and normally open valve 50 may be similar to that described in U.S. Pat. No. 8,920,860, incorporated herein by reference and assigned to the common assignee of the present invention. It will be further appreciated that once bottle 45 is attached to bottle holder 80 and is held in an upright position, as is illustrated in FIG. 2B, user 5 may manually lower slider 20 in order to start the carbonation process.

It will be appreciated that since bottle holder 80 may rotate freely around axis 55 when in a non-carbonating position, once carbonating arm 40 is lowered, protrusion 25 may engage with recessed area 35 and thus may prevent bottle holder 80 from rotating freely around axis 55.

It will be appreciated that user 5 may decide the level of carbonation he requires. It will be appreciated that when slider 20 is lowered, carbonating arm 40 is also lowered and may press against a carbonating pin 8 (not shown). The force against pin 8 may cause gas cylinder 12 to release $CO_2$ into bottle 45 via appropriate tubing (not shown) and via injector 75 (as shown in FIGS. 2A and 2B) and as described in US publication 2013-0037969 A1. It will be appreciated that the longer slider 20 (and carbonating arm 40) are held down, the more $CO_2$ may be added to bottle of water 45.

The action of carbonating arm 40 lowering may also cause cam surface 70 to press plunger 52 inwards, thus sealing valve 50 and ensuring a sealed environment within system 100 during the carbonation process. It will be appreciated that the carbonation process may cause pressure to build up within bottle 45.

It will be further appreciated that after carbonation, the contents of water bottle 45 may be under significant pressure. Therefore the immediate release of water bottle 45 may create a "rocket effect" when it is removed from bottle holder 80.

Figure 3A:
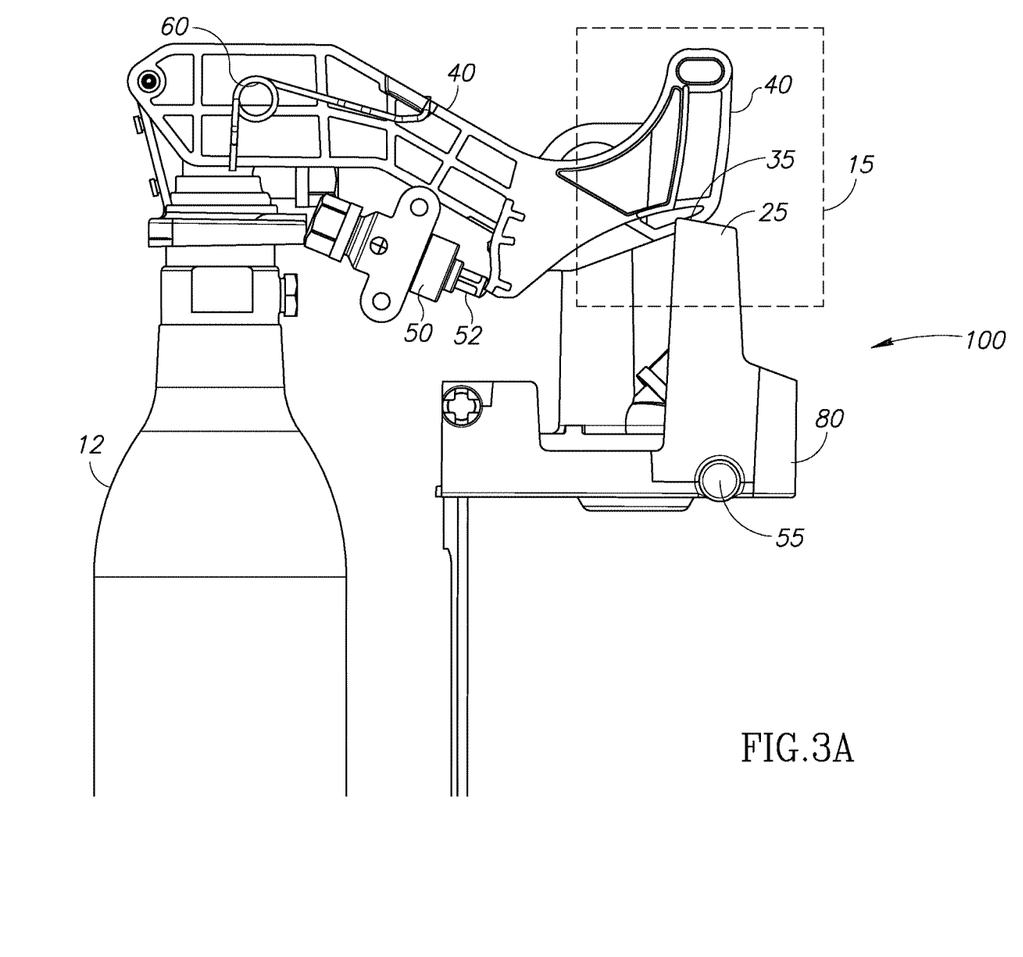
FIGS. 3A and 3B are schematic illustrations of the use of a mechanical lock in the home carbonation system of FIG. 1, constructed and operative in accordance with the present invention.
Figure 3B:
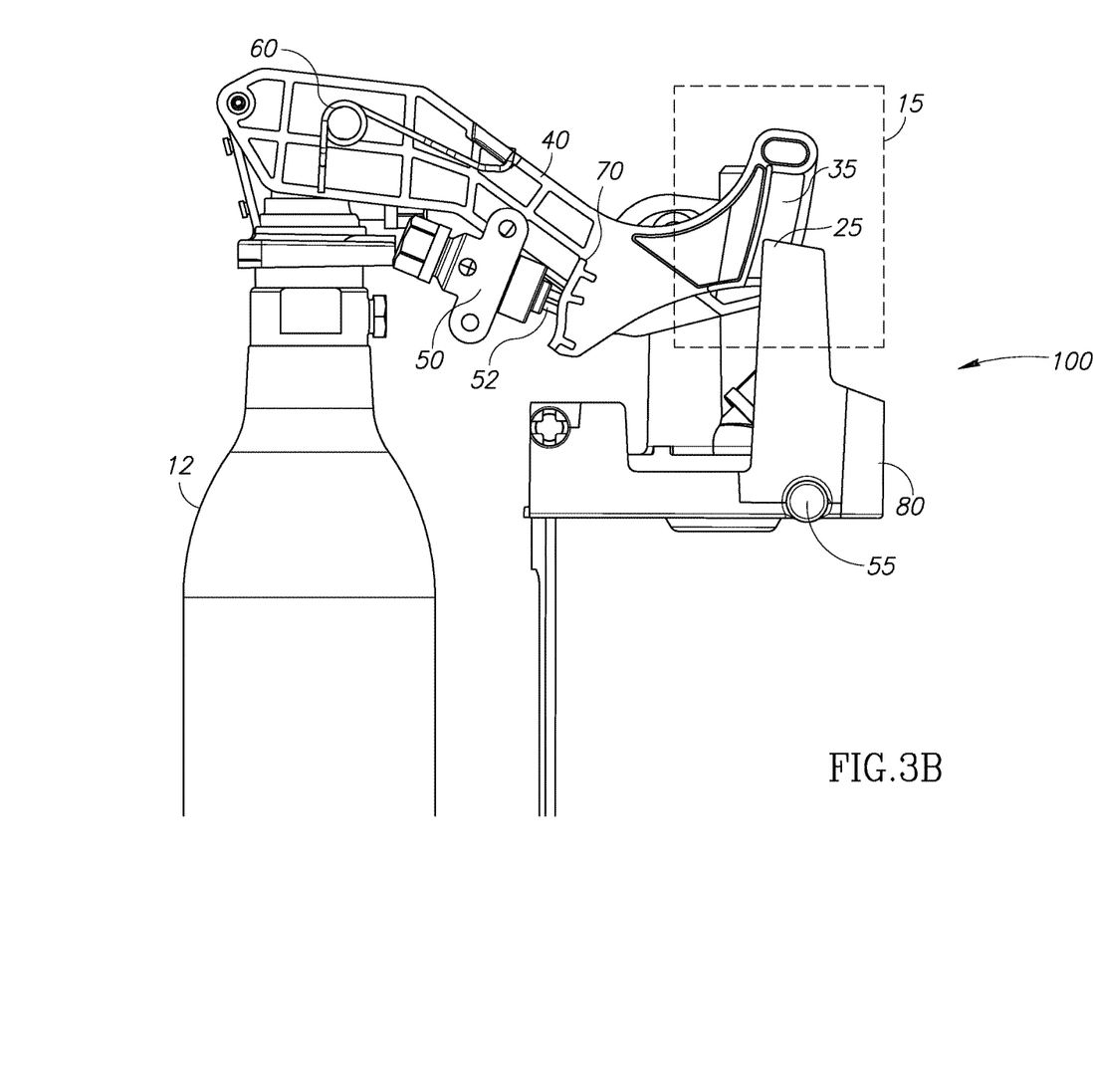

In accordance with a preferred embodiment of the present invention, once carbonating arm 40 is lowered using slider 20 as is illustrated in FIGS. 3A and 3B to which reference is now made, protrusion 25 may be held in place by recessed area 35 thus creating a mechanical lock. It will be appreciated that the purpose of mechanical lock 15 is to prevent bottle holder 80 from being tilted in order to release bottle 45 until all excess gas has been released from system 100. Thus, if carbonating arm 40 does not rise, bottle 45 may not be released from bottle holder 80.

Figure 4A:
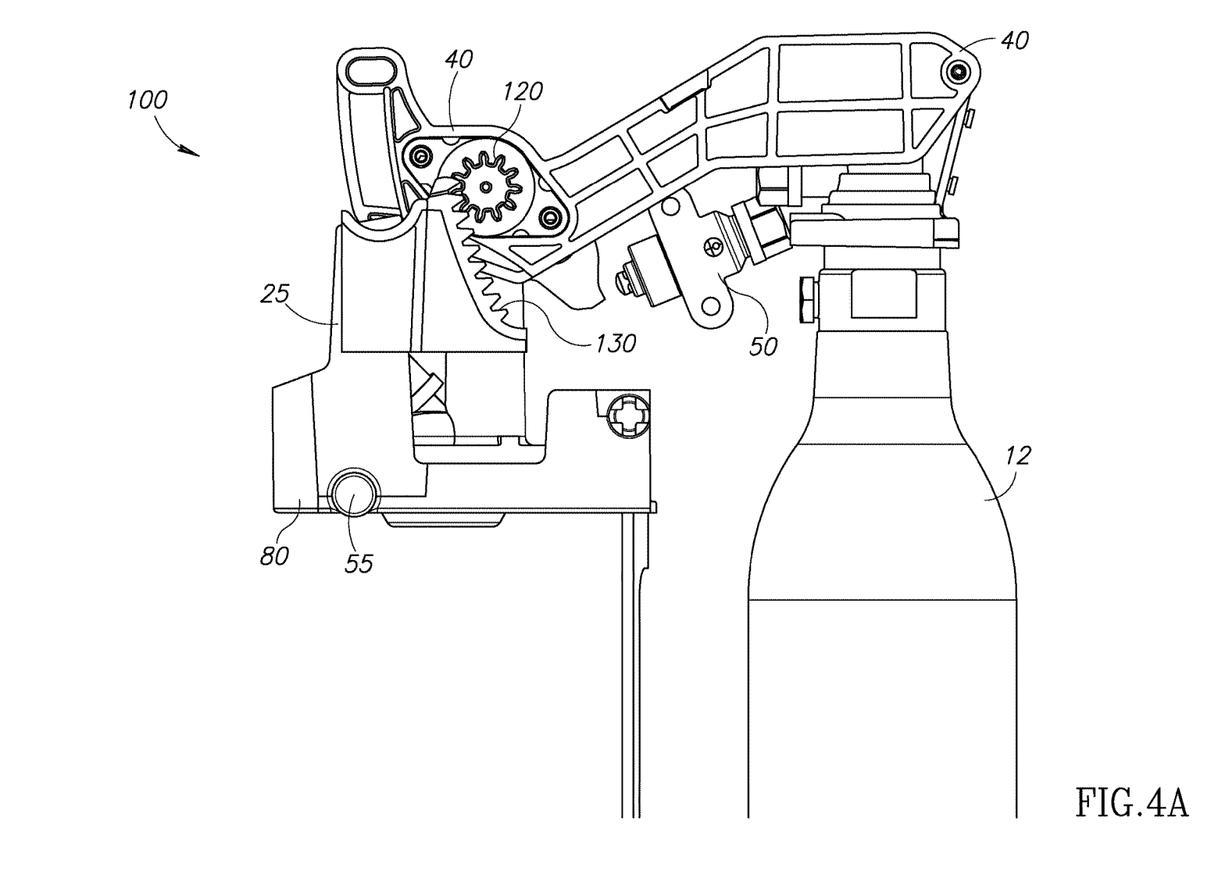
FIGS. 4A and 4B are schematic illustrations of the use of a damper with the home carbonation system of FIG. 1, constructed and operative in accordance with the present invention.
Figure 4B:
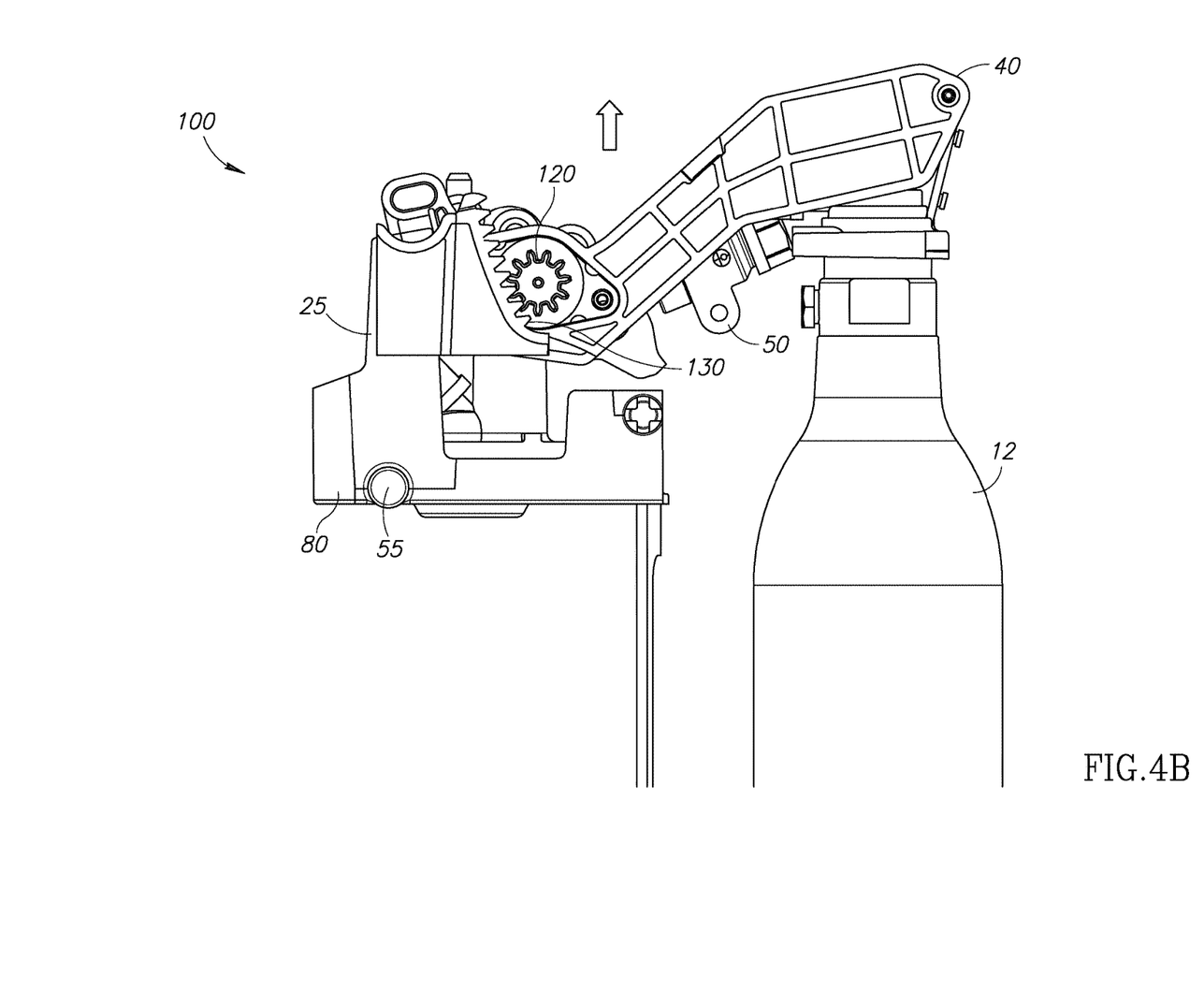

It will be further appreciated that the only way to release the mechanical lock and thus release bottle 45, is to raise carbonating arm 40 back to its non-carbonation state. It will be appreciated that manually raising carbonating arm 40 (or allowing it to rise automatically via spring 60), may move cam surface 70 away from plunger 52 thus opening valve 50 and releasing all the excess gas from system 100. As discussed herein above, the time taken for system 100 to depressurize, may be longer than the time taken to manually release the mechanical lock. Therefore if user 5 removes bottle 45 from system 100 before all the excess gas has been released, the dangerous "rocket effect" may occur. Reference is now made to FIGS. 4A and 4B which illustrate another view of system 100. It will be appreciated that system 100 may also comprise a damper 120. and FIG. 4A illustrates system 100 with carbonating arm 40 returned to its pre-carbonation position and FIG. 4B illustrates system 100 with carbonating arm 40 in its depressed position In accordance with an embodiment of the present invention, damper 120 may be set to rotate over teeth 130 so that once depressed and released, slider 20 and carbonating arm 40 may rise in a controlled velocity.

It will be appreciated that damper 120 may ensure the unified movement of carbonating arm 40 to the upper position. The controlled unified movement may move cam surface 70 away from plunger 52, thus allowing valve 50 to be opened and therefore allowing pressure from the carbonating process in system 100 to be released in a controlled manner so that by the time carbonating arm 40 and slider 20 are in their pre-carbonation position, all pressure has been released. It is only when carbonating arm 40 and slider 20 are back in this position, that mechanical lock 15 may be released and bottle 45 may be safely released from system 100.

It will be appreciated that damper 120 may be a viscose damper and that its timing may be adjustable to work at different speeds.

As discussed herein above, damper 120 may allow for a controlled rising of carbonating arm 40. Applicants have realized if for any reason the excess pressure in bottle 45 is not sufficiently released due to some form of failure, once carbonating arm 40 has risen and the mechanical lock has been released, user 5 may still remove bottle 45 and the dangerous "rocket effect" may occur as discussed herein above.

It will be appreciated that a typical home carbonation system comprises an exhaust valve to release excess pressure from bottle 45 during the carbonation process and any excess pressure remaining in bottle 45 after the carbonation process has ended.

Figure 5A:
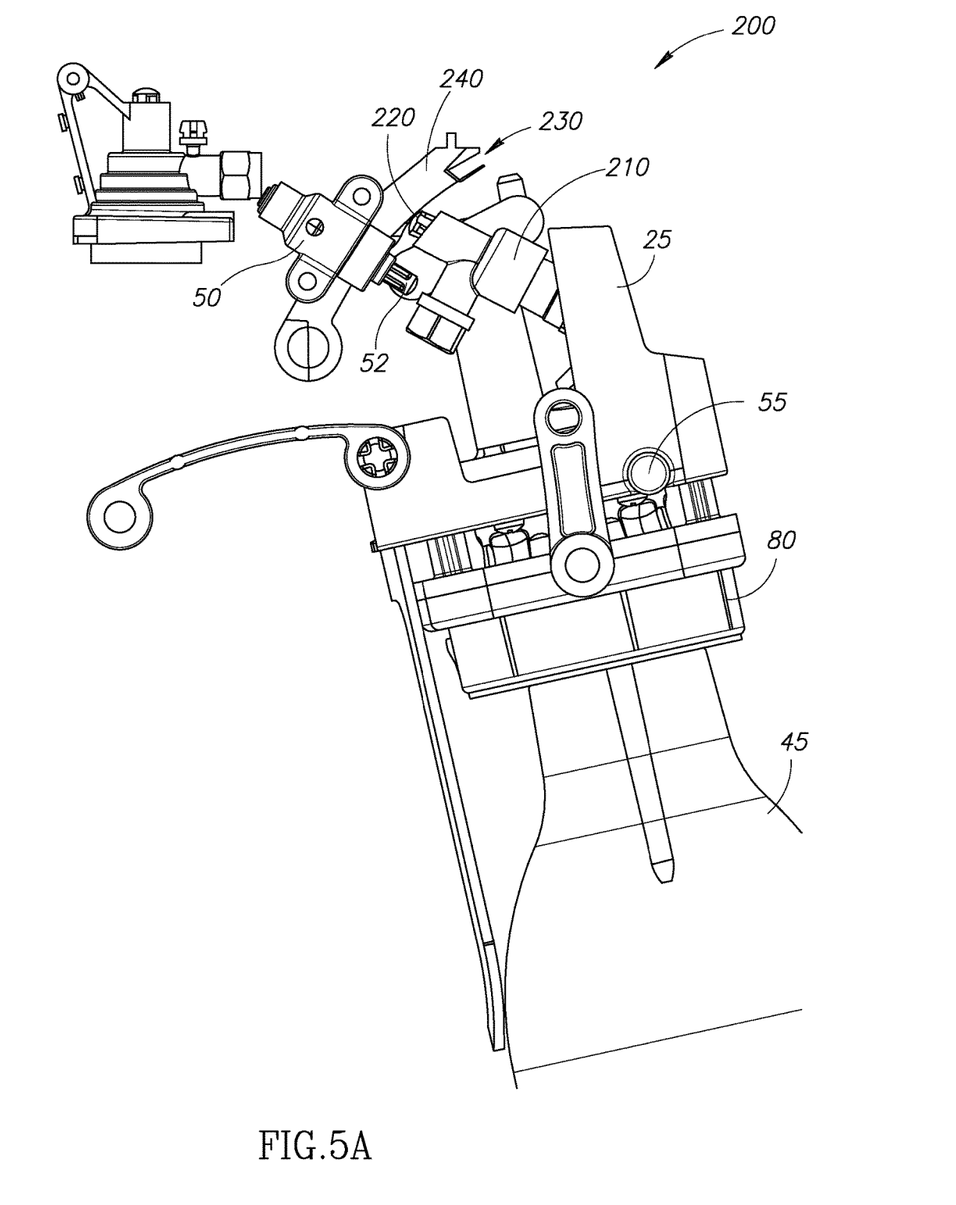
FIGS. 5A and 5B are schematic illustrations of an alternative embodiment of a home carbonation system; constructed and operative in accordance with the present invention.
Figure 5B:
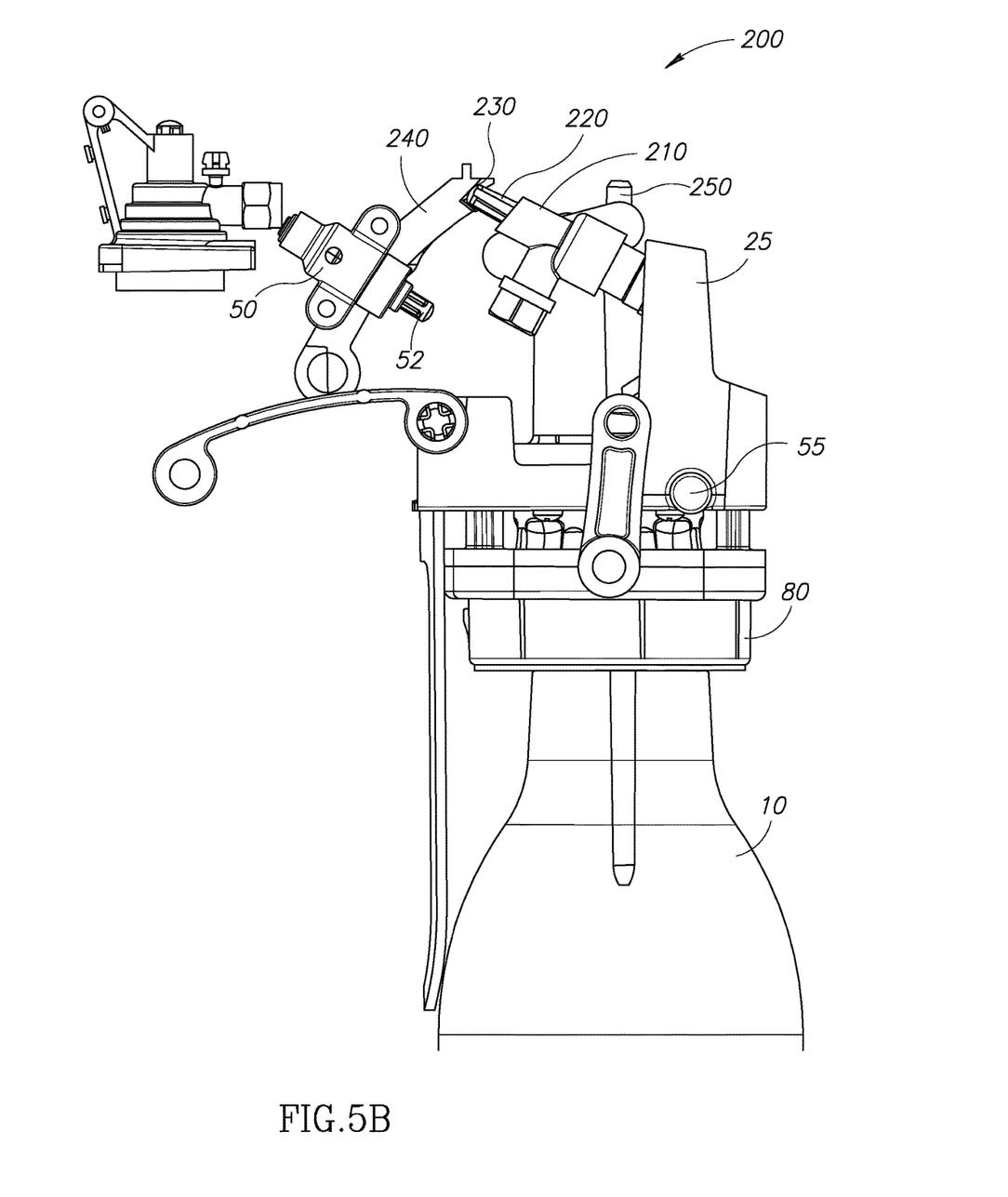

Reference is now to FIGS. 5A and 5B which illustrate a home carbonation system 200 in accordance with an embodiment of the present invention. FIG. 5A illustrates system 200 at rest (before and after carbonation) when there is no pressure build up to be released, and bottle holder 80 may freely rotate around axis 55 allowing bottle 45 to be attached/removed (as described herein above) and FIG. 5B illustrates system 200 during carbonation when there is built up pressure in system 200 and the rotation of bottle holder 80 around axis 55 is inhibited and therefore bottle 45 is held in a locked position as described in more detail herein below.

It will be appreciated that system 200 may contain all the features of system 100 and may also comprise exhaust valve 210 which may further comprise an exhaust pin 220. It will also be appreciated that system 200 may also comprise a secondary cam surface 240 which may be attached to its housing. When system 200 is at rest (as is illustrated in FIG. 5A), exhaust pin 220 may slightly protrude from exhaust valve 200 and bottle holder 80 may freely rotate around axis 55 as described herein above. During carbonation, the excess buildup of pressure within exhaust valve 210 (before it is released) may push exhaust pin 220 outwards.

It will also be appreciated that exhaust valve 210 may be attached to a carbonating head upper 250 which may be part of the carbonating head assembly 270 (not shown) of system 200. It will be further appreciated that bottle holder 80 and protrusion 25 may also be part of carbonating head 270. Carbonating head 270 may rotate around axis 55 as described herein above. Carbonating head 270 may be similar to that described in U.S. Pat. Nos. 7,975,988 and 8,920,860 both incorporated herein by reference and assigned to the common assignee of the present invention.

Secondary cam surface 240 may comprise a recessed area 230. When bottle 45 is held in an upright position within bottle holder 80 (as is illustrated in FIG. 5B) during carbonation, exhaust pin 220 may be positioned over recessed area 230. Thus when exhaust valve 210 is under pressure and exhaust pin 220 is extended, it may engage with recessed area 230.

It will be appreciated that while exhaust pin 220 is engaged with recessed area 230, carbonation head 270 cannot move and as a result, bottle holder 80 may be prevented from rotating around axis 55. Thus, bottle 45 may remain in a locked position, thus preventing its removal from bottle holder 80, until sufficient pressure has been released from bottle 45.

Once the pressure has been released from bottle 45 and exhaust valve 210, exhaust pin 220 may retreat back to its rest position, disengaging from recessed area 230 and allowing bottle holder 80 to rotate around axis 55 (as described herein above).

Figure 6:
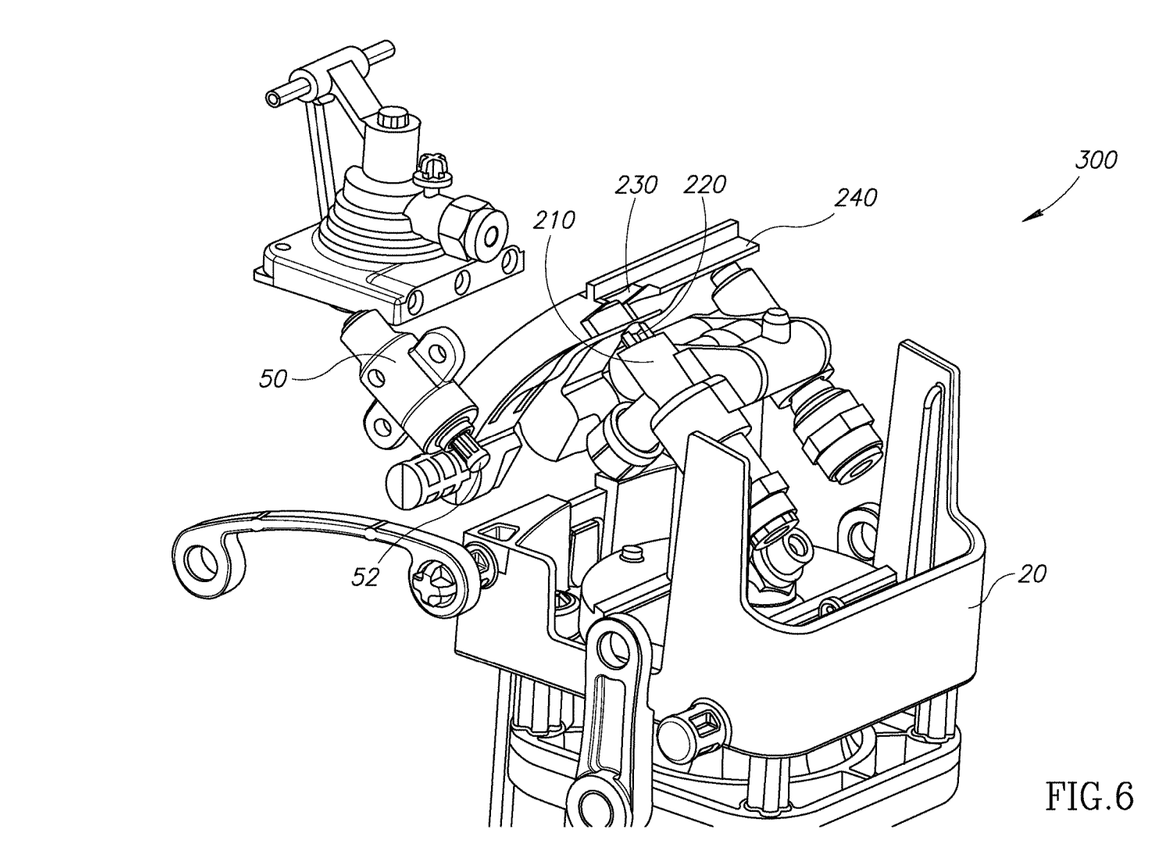
FIG. 6 is a schematic illustration of a home carbonation system utilizing the combined features of the home carbonation systems of FIGS. 1, 5A and 5B.

It will be appreciated that although system 100 and 200 may function independently, they may also both be implemented within the same home carbonation system 300 as is illustrated in FIG. 6 to which reference is now made. It will be appreciated that the gradual release of pressure from bottle 45 via normally open valve 50 (as described herein above) may also cause a decrease in pressure within exhaust valve 210, eventually causing exhaust pin 220 to retract and to disengage from recessed area 230 as described herein above. Therefore, in a scenario due to some form of system failure when excess pressure remains within bottle 45 after carbonation and damper 120 continues to rotate slowly raising carbonating arm 40, exhaust pin 220 may remain engaged with cam surface 240, thus preventing bottle holder 80 from rotating around axis 55 and thus preventing bottle 45 from being released from its mechanical lock.

Thus, by gradually releasing the pressure build up in a home carbonation system, caused by pressurized $CO_2$ released into the bottle used in the carbonation process, a bottle of freshly carbonated liquid may be removed safely and quickly from a home carbonation system.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A home carbonation system, the home carbonation system comprising:
    a carbonating arm connected to a housing of said home carbonation system such that lowering the arm causes carbonation, said carbonating arm having a cam surface;
    a normally open valve having a plunger pressable by said cam surface during carbonation to seal said normally open valve;
    a mechanical lock that is configured to lock a bottle in an upright position within said home carbonation system when the carbonating arm is lowered from a non-carbonation state; and
    a gradual releaser comprising a damper and active after said carbonation has ended, the gradual releaser configured to cause the carbonating arm to be raised, opening said normally open valve, at a rate that is sufficiently gradual such that the carbonating arm is raised to the non-carbonation state to unlock said mechanical lock only after all pressure is released from said bottle.

2. The home carbonation system according to claim 1 and wherein said damper is a viscose damper.

3. The home carbonation system according to claim 1 and also comprising:
    a bottle holder to hold said bottle during said carbonation; and
    an axis around which said bottle holder rotates at an angle to receive said bottle for said carbonation and to release said bottle after said carbonation; and
    wherein said mechanical lock comprises a recessed area in which a protrusion of said bottle holder sits when said bottle is in an upright position and wherein said recessed area prevents said bottle holder from rotating around said axis when said carbonating arm is lowered.

4. The home carbonation system according to claim 3 and also comprising an exhaust valve having an exhaust pin and wherein said exhaust pin extends from said exhaust valve when said exhaust valve is under pressure and wherein said exhaust pin engages with a recessed area of a secondary cam surface when extended to prevent said bottle holder rotating around said axis.

* * * * *